United States Patent [19]

Korkosz

[11] 4,170,896

[45] Oct. 16, 1979

[54] BALANCING OF HIGH-SPEED SHAFTS
[75] Inventor: Gregory J. Korkosz, Malibu, Calif.
[73] Assignee: Summa Corporation, Las Vegas, Nev.
[21] Appl. No.: 890,610
[22] Filed: Mar. 20, 1978
[51] Int. Cl.$^2$ .............................................. G01M 1/32
[52] U.S. Cl. ........................................ 73/66; 73/462; 73/468; 73/622
[58] Field of Search .................. 73/66, 460, 461, 462, 73/468, 622; 64/1 V; 74/573 R

[56] References Cited

U.S. PATENT DOCUMENTS

| | | | |
|---|---|---|---|
| 3,071,972 | 1/1963 | Koenig | 73/462 |
| 3,426,437 | 2/1969 | Rebhun et al. | 73/622 |
| 3,604,248 | 9/1971 | Altmann et al. | 73/66 |
| 4,114,456 | 9/1978 | Dory | 73/622 |

*Primary Examiner*—James J. Gill
*Attorney, Agent, or Firm*—Smyth, Pavitt, Siegemund, Jones & Martella

[57] ABSTRACT

In some helicopters power is transmitted from a gearbox adjacent the engine to the tail rotor by a long shaft. To minimize weight, a tubular shaft is used, which rotates at supercritical speeds. Vibrations resulting from shaft unbalance are magnified by resonance as the shaft passes through its critical speeds making it essential that the shaft be finely balanced. This is accomplished by slowly rotating the shaft about its axis while measuring at a chosen station along its length both the wall thickness of the tubular shaft and the distance from a fixed reference plane to the outer surface of the shaft. From these data are determined the local cross sectional area and the location of the center of gravity at the chosen station. From the latter two quantities are determined both the amount of counterweight required and its required angular location around the shaft, for the chosen station. The measurements are repeated at a large number of stations along the shaft. Self-adhering aluminum tape is used as the counterweight, which is applied to the outer surface of the shaft in a continuous manner along its length. The number of layers of tape and their width determine the amount of weight applied. It is assumed that the variation in mass density of the shaft is negligible.

15 Claims, 16 Drawing Figures

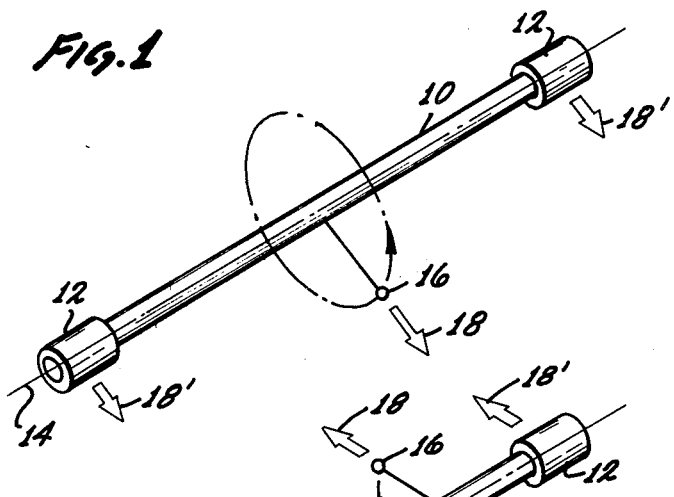
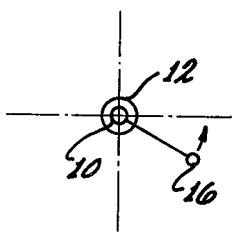
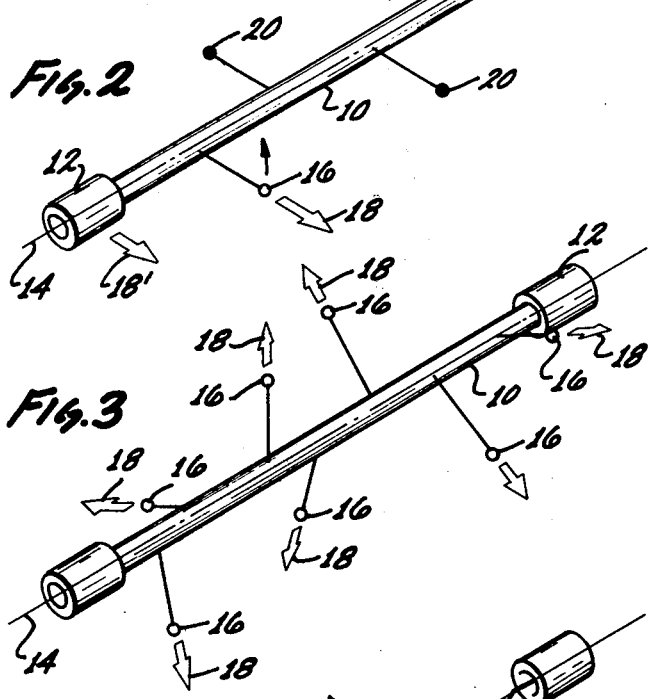
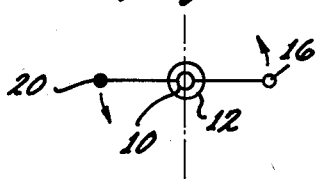
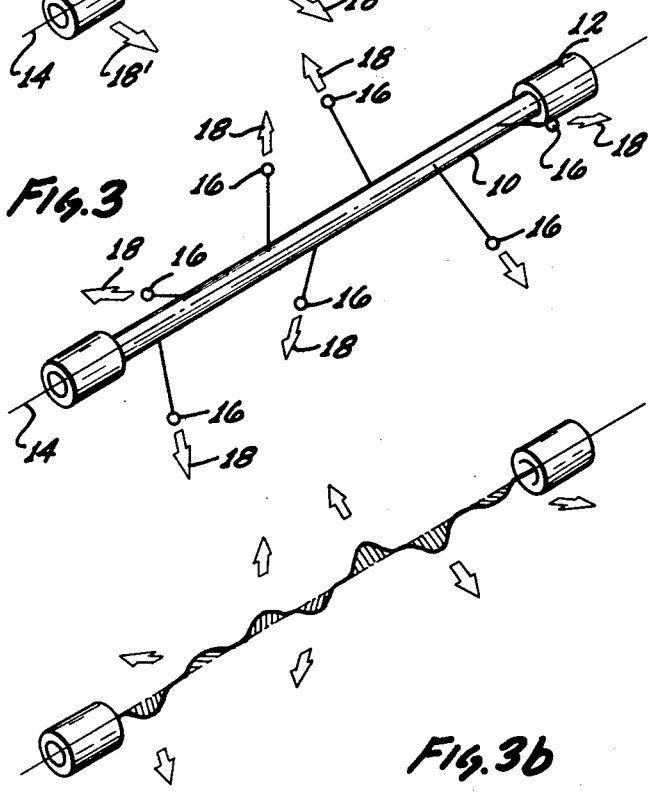
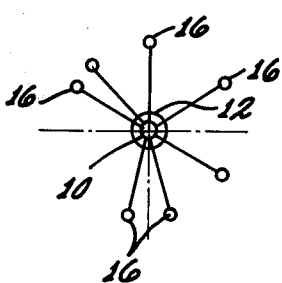

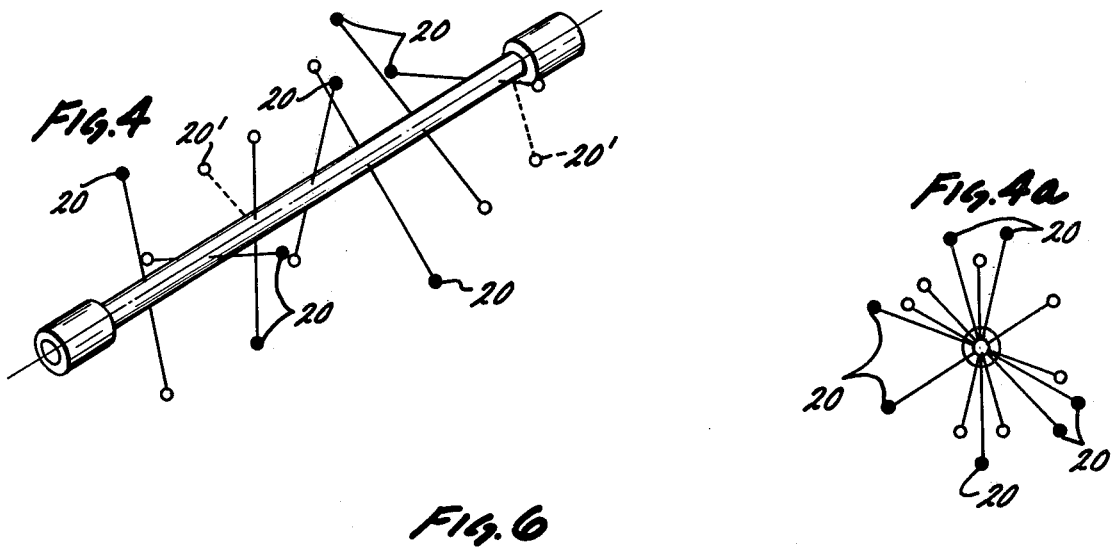
Fig. 4
Fig. 4a
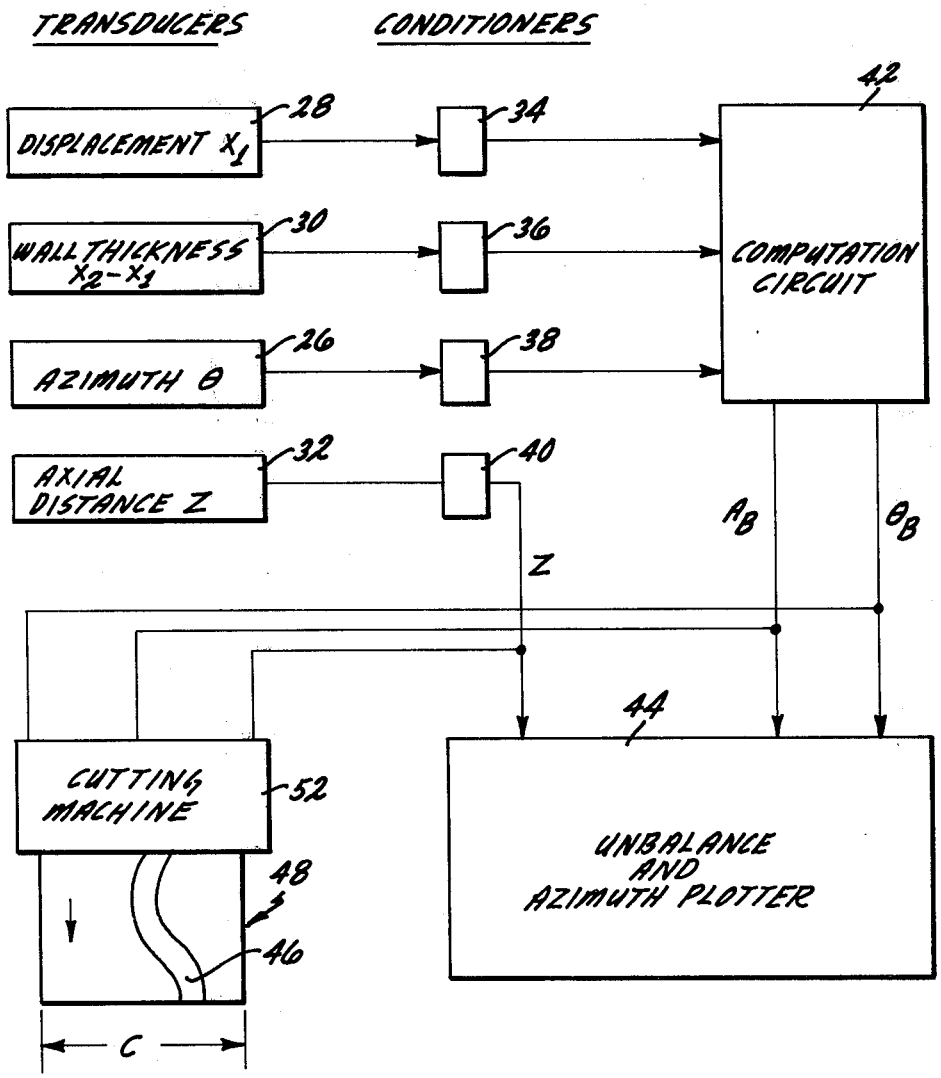
Fig. 6

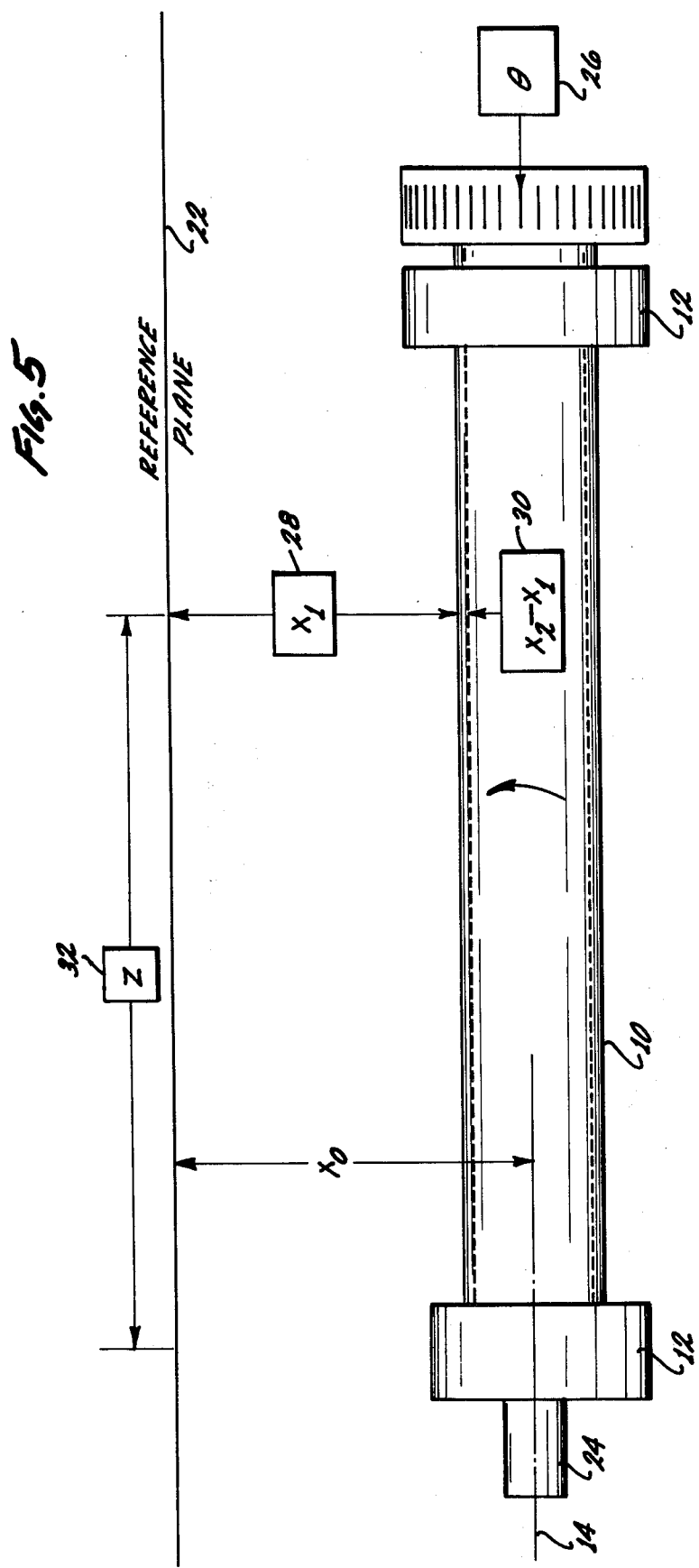

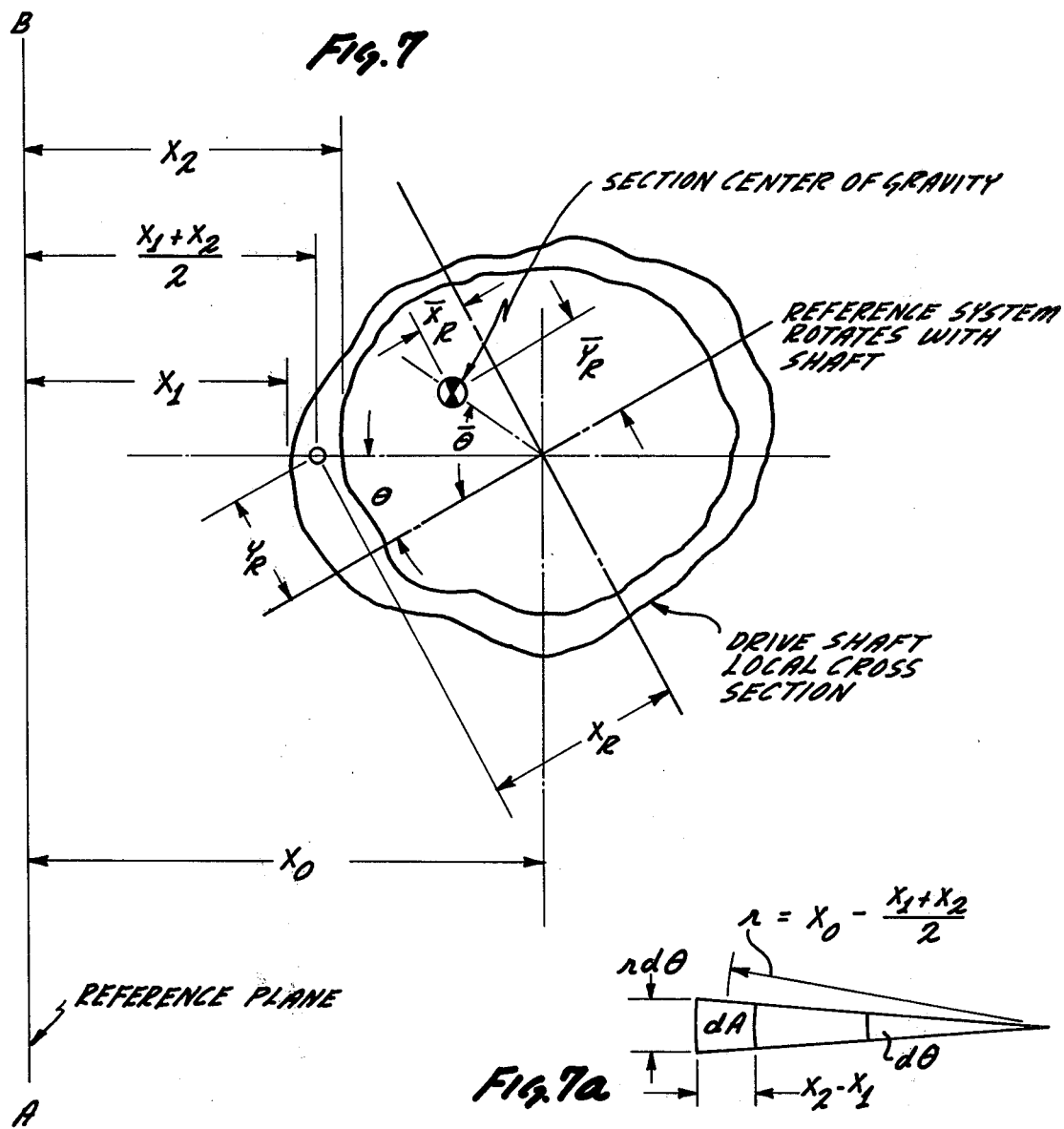
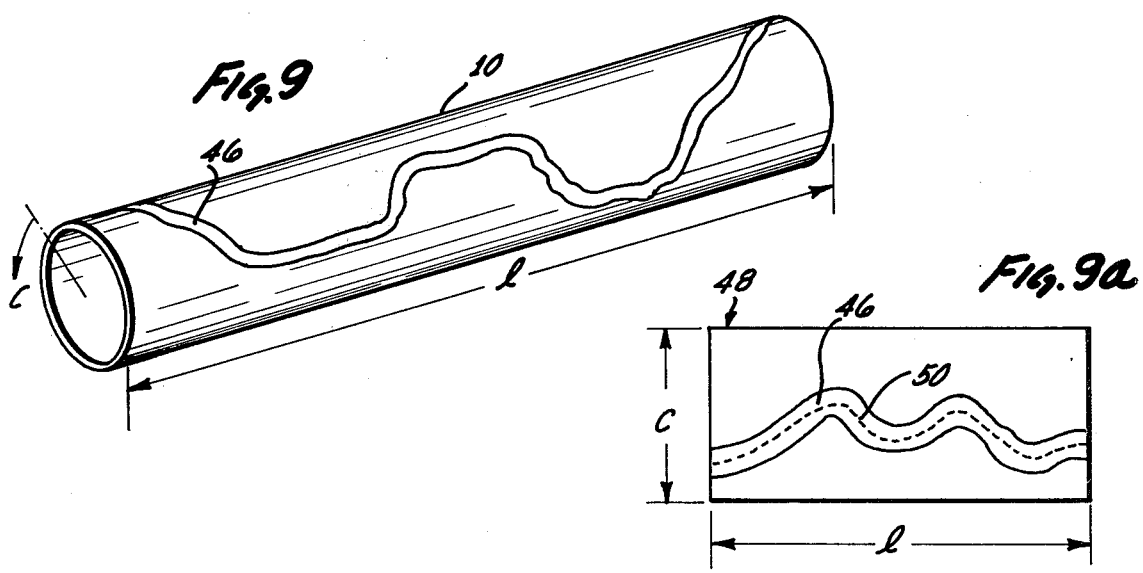

BALANCING OF HIGH-SPEED SHAFTS

BACKGROUND OF THE INVENTION

The present invention is in the field of dynamic balancing techniques and specifically relates to a procedure for balancing relatively long shafts for use at very high rotational speeds.

Typical of the shafts to which the method of the present invention applies are the driveshafts used in helicopters to transmit hundreds of horsepower from the gearbox adjacent the engine to the tail rotor. Typically, such a shaft is an aluminum tube of 4.5 inches outside diameter, 16 feet long, having a wall thickness of 0.065 inches, and transmitting several hundred horsepower at 8000 rpm.

There is a limit to how much power a shaft of a given mass can transmit safely. Normally there is a trade-off between a relatively short and thick shaft transmitting a large torque at low speed or a relatively thin and long shaft transmitting a small torque and rotating at high speed. The present invention is concerned with the latter alternative because the distance is relatively large. Therefore, the shaft is rotating at a relatively high speed. To save weight, the driveshaft is in the form of a hollow tube.

An ideal driveshaft would be assembled from a tube that is absolutely round, absolutely straight, and has uniformly thick walls. Unfortunately, this condition is never found in actual practice. In practice, the cross sections of the tubes are distorted, the tubes are bowed, and the walls include thicker and thinner spots.

When a shaft is long relative to its diameter, it is more susceptible to whipping caused by an unbalanced mass distribution, and this is aggravated as the speed increases. Although some of the defects in the tube are of a relatively minor nature, at high speed the effect of the relatively minor imperfections is quite pronounced, indicating that careful balancing of the shaft is necessary to run at such high speeds.

The natural frequencies of a simply supported shaft are given by the following equation:

$$\omega_n = (n\pi)^2 \sqrt{\frac{EI}{\mu_1 l^4}}$$

where;

$\omega_n = n^{th}$ natural frequency (rad $-\sec^{-1}$)
n = Mode number (1, 2, 3, etc.)
$\mu_1$ = Mass per unit length of shaft (lb in. $^{-2}$ sec$^2$)
E = Modulus of elasticity (lb in. $^{-2}$)
I = Moment of inertia of section of shaft about a diameter (in.$^4$)
l = Length of shaft (in.)

The rotational speed of the shaft equal to the fundamental frequency of vibration of the shaft is also called the critical speed of the shaft corresponding to operation in mode 1, i.e., the fundamental frequency of the shaft. The present invention is concerned with shafts that operate at speeds between the second and third critical speeds (modes no. 2 and 3). As the shaft spins up to speed it must pass through the first and second critical speeds, corresponding to modes no. 1 and 2. Unbalance of the shaft is particularly detrimental when the shaft is rotating at any of the critical speeds, because vibrations resulting from shaft unbalance are magnified at those speeds.

As designers become more weight and vibration conscious for new aircraft designs, the introduction of power-transmitting shafts that run at supercritical speeds becomes increasingly attractive. Balancing such high-speed shafts so they run smoothly has long been a problem, with the process being both difficult and costly. It traditionally requires many trial runs over the speed spectrum to achieve good balance.

THE PRIOR ART

It is a well-known theorem of mechanics that any angular distribution of a number of unbalanced masses along a shaft can be brought into dynamic balance by applying two properly chosen counterweights to the shaft at axially spaced locations, and, in general, at different angular positions around the shaft. That is, vibrating forces on the shaft bearings can be eliminated. This theorem is based on the assumption that the shaft is utterly rigid and the theorem is indifferent to the stresses set up in the shaft by the unbalanced masses and counterweights. These stresses and the distortion of the shaft which they produce cannot be ignored at the supercritical shaft speeds.

A theory more relevant for supercritical shaft speeds is that of successive harmonic anti-node balancing. That theory is based on the idea that those sections of the shaft located at the anti-nodes require the most crucial balancing. Since the shaft is operated at a speed between some of its lower natural frequencies only a few anti-nodes are available, and consequently the balancing is not continuous along the shaft, resulting in stresses and distortions of the shaft. As a result, this method has met with only limited success.

SUMMARY OF THE INVENTION

The limited success of the traditional balancing method indicated there must be a better approach. The basic causes of shaft unbalance—distorted cross section, nonuniform wall thickness and shaft bow—were examined to develop a simple explanation for why shafts need balancing, and a simple method for doing it.

The method described herein accounts for all the mass eccentricity that can be identified with geometry. It determines the coordinates of the center of gravity, and the local cross sectional area of all the shaft sections along the length of the shaft. This information is combined to establish the amount of counterweight and the required location of the balance weight along the shaft needed to bring the center of gravity of each segment along the shaft back to the center line of rotation. It is assumed that the varation in mass density of the shaft is negligible.

In the preferred embodiment of the present invention, the shaft is to be balanced is mounted in the apparatus described herein which includes provision for rotating the shaft slowly about its axis. After the shaft has been mounted in the balancing apparatus, it is slowly rotated about its axis while both the wall thickness of the tubular shaft and the distance from a fixed reference plane to the outer surface of the shaft are continuously measured at a chosen station along the length of the shaft. From these data are determined the local cross sectional area and the location of the center of gravity at the chosen station. From the latter two quantities are determined both the amount of counterweight required and its required angular location around the shaft, for the chosen station. The measurements are repeated at a large number of stations along the shaft, permitting graphs to be made showing the required amount of counterweight and its angular position versus distance along the shaft. Self-adhering aluminum tape is used as the counterweight, and it is applied to the outer surface of the shaft in a continuous manner along the length of the shaft. The number of layers of tape and their width determine the amount of counterweight applied at any point along the shaft.

The novel features which are believed to be characteristic of the invention, both as to organization and method of operation, together with further objects and advantages thereof, will be better understood from the following description considered in connection with the accompanying drawings in which the preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a diagram in perspective view showing a shaft having a single unbalanced mass;

FIG. 1a is a diagram showing an end view of the shaft of FIG. 1;

FIG. 2 is a diagram in perspective view showing a shaft having two unbalanced masses disposed at different stations along the shaft;

FIG. 2a is an end view of the shaft of FIG. 2;

FIG. 3 is a diagram in perspective vview showing a shaft having a number of unbalanced masses disposed at different stations along the shaft;

FIG. 3a is a diagram showing an end view of the shaft of FIG. 3;

FIG. 3b is a diagram in perspective view showing the distorting effect of the stresses produced by the unbalanced masses in the shaft of FIG. 3;

FIG. 4 is a diagram in perspective view showing the application of counterweights to the shaft of FIG. 3 to balance it;

FIG. 4a is a diagram showing an end view of the shaft of FIG. 4;

FIG. 5 is a diagram showing the layout of the apparatus used in applying the method in the present invention;

FIG. 6 is an electrical block diagram showing the electrical interconnection of the transducers and other apparatus used in practicing the present invention;

FIG. 7 is a diagram of a cross sectional view of a tubular shaft having exaggerated defects and is used in the mathematical analysis of the present invention;

FIG. 7a is a geometric diagram used in the mathematical analysis of the present invention;

FIG. 9 is a perspective view of a tubular shaft after the counterbalancing tape has been applied to its outside surface; and, FIG. 9a is a plan view of a sheet of metal on which the balancing tape has been laid out.

DESCRIPTION OF THE PREFERRED EMBODIMENT

Figure 8:
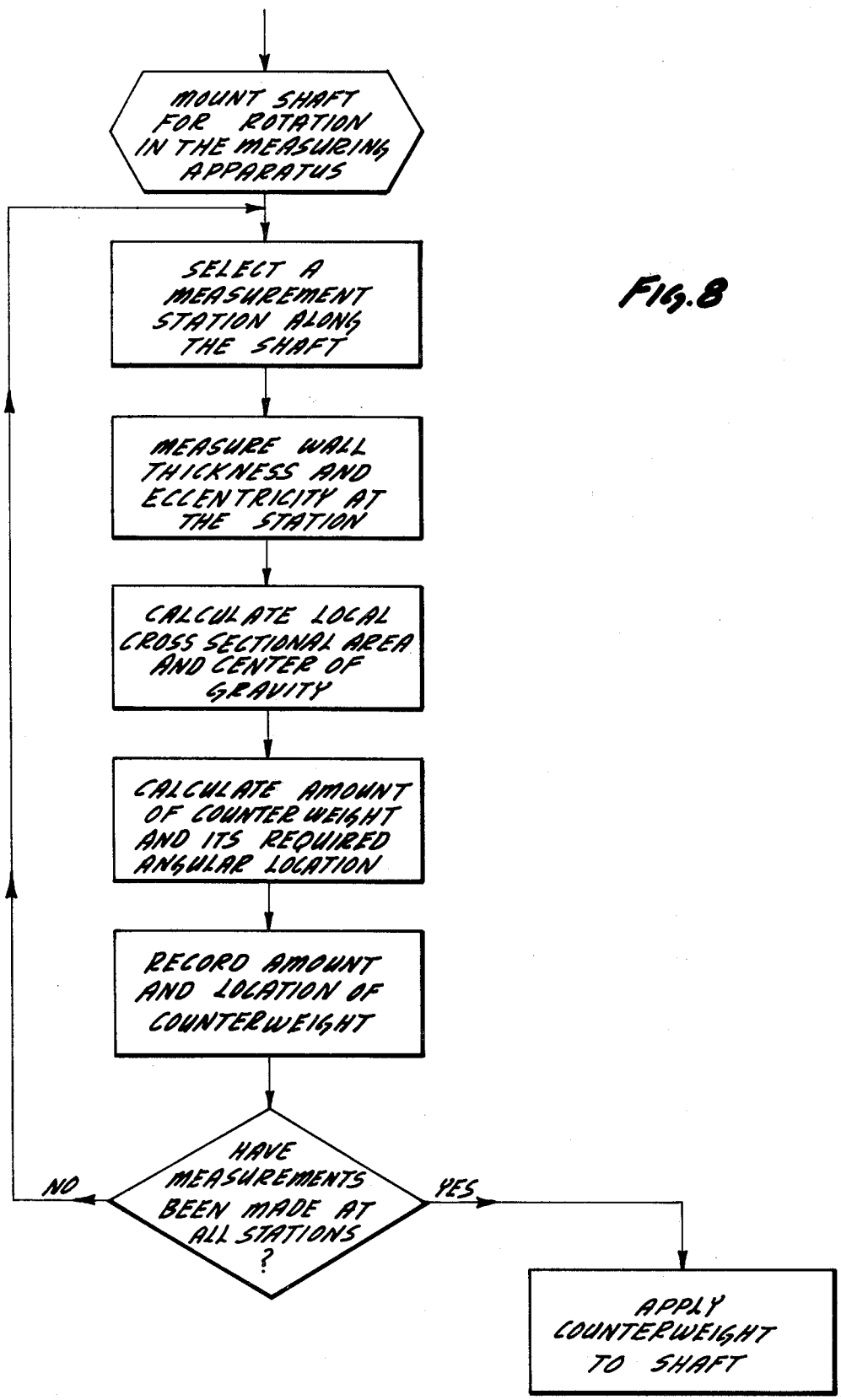
FIG. 8 is a flow chart showing the steps in a preferred embodiment of the method of the present invention.

Turning now to the drawings in which like parts are denoted by the same reference numeral, there is shown in FIG. 1 a shaft 10 mounted in bearings 12 for rotation about an axis 14. The shaft 10 is assumed to have an unbalanced mass 16 located at some point along its length. This single unbalanced mass 16 produces an unbalanced centrifugal force 18 when the shaft 10 rotates about the axis 14. The unbalanced force 18 causes side load forces 18' to be exerted by the shaft 10 on the bearings 12. These forces are transmitted by the bearing 12 to the structure to which they are attached, thereby vibrating it. Clearly, the single unbalanced force 18 will cause the shaft 10 to be pendulous and for this reason the shaft 10 of FIG. 1 is said to be statically unbalanced.

In FIG. 2 is shown a shaft 10 having two equal unbalanced masses 16 spaced along the axis 14 from each other and located on opposite sides of the shaft 180° apart in rotation, as indicated in FIG. 2a. Unlike the shaft of FIG. 1, the shaft of FIG. 2 is statically balanced, but is said to be dynamically unbalanced because as the shaft rotates about the axis 14 the unbalanced forces 16 cause the shaft 10 to exert side forces 18' against the bearings 12 of FIG. 2. The side forces 18 are seen to rotate with the shaft but are spaced around the shaft 180° apart. The side forces 18' are seen to form a couple tending to rotate the axis of the shaft.

In the conventional technique for balancing shafts, the couple formed by the side load forces 18' is cancelled by an equal and opposite couple resulting from the applied counterweights 20.

It is well known that any angular distribution of any number of unbalanced masses located along the shaft can be brought into dynamic balance by applying two properly chosen counterweights to the shaft at axially-spaced locations and, in general, at different angular positions around the shaft. That is, the vibrating side loads 18' on the shaft bearings 12 can be eliminated. This conventional technique, however, is based on the assumption that the shaft remains rigid, regardless of the stresses set up in it by the unbalanced masses and the counterweights as they rotate. For supercritical shaft speeds this assumption is not warranted because at those speeds even relatively small unbalanced masses 16 produce relatively large centrifugal forces which are sufficiently large to distort the shaft, thereby further increasing the unbalance. This situation is illustrated in FIG. 3.

FIG. 3 shows a shaft 10 having a relatively large number of unbalanced masses 16 distributed along its length. These unbalanced masses produce centrifugal forces 18 in the shaft when it is rotated, urging the shaft to distort as indicated in FIG. 3b.

The present invention is based on the idea that the shaft distortion illustrated in FIG. 3b can be eliminated only if each of the individual unbalanced masses 16 is counterbalanced by a corresponding counterweight located at the same station along the shaft as the unbalanced mass. Thus, according to the present invention, each unbalanced mass along the shaft 10 would be counterbalanced by a corresponding counterweight 20 as shown in FIGS. 4 and 4a. When this has been done, the distorting forces are eliminated.

In contrast, when the conventional balancing method is applied, two axially-spaced counterweights 20' would be applied to the shaft instead of the counterweights 20, and as a result, the shaft would be subject to distorting forces similar to those shown in FIG. 3b.

However, the present invention is also based on the realization that as a practical matter, unbalanced mass occurs at every point along the shaft and, therefore, the present invention further includes the concept of employing a continuous counterweight extending along the shaft and balancing the unbalanced forces at each and every point along the shaft.

The present application further discloses apparatus for accomplishing this continuous balancing at all points along the shaft. FIG. 5 shows a shaft 10 mounted in bearings 12 for rotation about the axis 14. The axis 14 is parallel to the reference plane 22 which is seen end-on in FIG. 5. A motor 24 is provided for rotating the shaft 10 about the axis 14, and an annular transducer 26 is provided to measure the amount of rotation. In one embodiment of the present invention the transducer 26 is a Model No. R 30 D, manufactured by the Shavits Engineering Company of Camden, New Jersey.

The separation between the reference plane and the outside wall of the shaft 10 is measured by the transducer $X_1$, 28, which in one embodiment of the present invention is a Model No. KD 2300-10 C manufactured by Kaman Sciences Corporation of Colorado Springs, Colorado.

A thickness transducer 20 measures the thickness of the shaft wall at the same location that the distance from the reference plane 22 is measured. In one embodiment, the wall thickness is measured by an ultrasonicc transducer known as Model Nos. PS-702 and DR-1000, manufactured by the Magnaflux Corporation of Chicago, Illinois.

The distance Z along the tube to the particular station at which the $X_1$ and $X_2$-$X_1$ measurements are made is determined by a transducer 32, which in one embodiment of the invention is a Model No. 10,000 DC-D made by Shavits Engineering Company of Camden, New Jersey.

The apparatus employed in practicing the method of the present invention assures that the bearings 12 are mounted relative to the reference plane 22 in such a way that the axis 14 of rotation is always parallel to the reference plane 22. The spacing between the axis and the reference plane is denoted by $X_0$.

The transducers 26–32 are connected electrically as shown in FIG. 6. Each of the transducers includes an output signal line on which it presents an electrical signal representative of the quantity measured. These signals are passed respectively through the signal conditioners 34–40 which convert them to an electrical form compatible with the computation circuit 42 and, in the case of the Z signal, with the unbalance and azimuth plotter 44. In one embodiment of the present invention, the recorder is a Model 136A, manufactured by the Hewlett-Packard Company of Palo Alto, California and the computation circuit is an analog computer employing quadrant multipliers such as those made by the INTECH CORPORATION of Santa Clara, California, and known as Model No. A-701.

The computation circuit 42 of FIG. 6 is used in a preferred embodiment to facilitate the calculations to be described below in connection with the discussion of FIG. 7, but it should be understood that the required computations can be performed manually, or by the use of a digital computer or microprocessor. The computations can be performed by any suitable means in accordance with the method of the present invention.

The purpose of the unbalance and azimuth plotter 44 of FIG. 6 is to provide a permanent record, in the preferred embodiment, of the amount of unbalance and the direction of the unbalance around the shaft in azimuth as a function of the distance along the shaft.

FIG. 7 is a diagram illustrating the relation between the measured variables, $\theta$, $X_1$, $X_2$−$X_1$, and $Z$, and the location of the section center of gravity around the axis and the amount of unbalance.

In FIG. 7, $X_R$ and $Y_R$ are the coodinates of the midpoint between $X_1$ and $X_2$ in the rotating coordinate system. The symbols, $\overline{X}_R$, $\overline{Y}_R$ and $\overline{\theta}$ represent the coordinates of the center of gravity of the particular section of the shaft being measured, expressed in the rotating coordinate system.

From FIG. 7 it is seen that the coordinates of the midpoint between $X_1$ and $X_2$ can be expressed in the rotated coordinate system as:

$$X_R = \left[X_0 - \frac{X_1 + X_2}{2}\right]\cos\theta$$

$$Y_R = \left[X_0 - \frac{X_1 + X_2}{2}\right]\sin\theta$$

From FIG. 7a it is seen that the elemental area dA is given by:

$$dA = (X_2 - X_1)\left[X_0 - \frac{X_1 + X_2}{2}\right]d\theta$$

Letting $\overline{X}_R$ and $\overline{Y}_R$ equal the displacements of the section center of gravity with respect to the rotated reference system, by definition:

$$\overline{X}_R = \frac{\int X_R dA}{\int dA}$$

$$= \frac{\int_0^{2\pi} (X_2 - X_1)\left[X_0 - \frac{X_1 + X_2}{2}\right]^2 \cos\theta\, dA}{\int_0^{2\pi} (X_2 - X_1)\left[X_0 - \frac{X_1 + X_2}{2}\right] d\theta}$$

$$\overline{Y}_R = \frac{\int Y_R dA}{\int dA}$$

$$= \frac{\int_0^{2\pi} (X_2 - X_1)\left[X_0 - \frac{X_1 + X_2}{2}\right]^2 \sin\theta\, d\theta}{\int_0^{2\pi} (X_2 - X_1)\left[X_0 - \frac{X_1 + X_2}{2}\right] d\theta}$$

The radial eccentricity of the section center of area is $$\overline{R} = (\overline{X}_R^2 + \overline{Y}_R^2)^{\frac{1}{2}}$$

and the azimuthal location is $$\overline{\theta} = \tan^{-1}(\overline{Y}_R/\overline{X}_R)$$

The counterweight material is assumed to be applied to the outside surface of the shaft.

Let:

$\sigma_s$ = Density of the shaft material
$\sigma_B$ = Density of the balance material
$A_s$ = Section area of the shaft
$A_B$ = Section area of the balance
$R$ = Shaft outer radius Then $$A_B = A_s \sigma_s R / \sigma_B R$$

Placed at azimuth $$\theta_B = (\theta + \pi)$$

In this manner are determined the amount of counterbalancce and its required angular position around the shaft. For each station, the counterweight is placed 180° around the shaft from the unbalanced shaft.

By way of summation, FIG. 8 is a flow chart showing the steps of the method of the present invention in a preferred embodiment. Clearly a number of variations on the method shown in FIG. 8 are within the scope of the present invention.

For example, a preparatory step could be provided in which the shaft is straightened, or annealed, or in which a surface treatment or coating is supplied to the shaft.

In one alternative embodiment, after the measurement of wall thickness and shaft eccentricity has been completed at a particular station, the counterweight for that station is applied to the shaft at that station before the measurements are made at the next selected station.

In another embodiment, as the shaft is slowly rotated, the measurements at a particular station are made intermittently at various discrete angles around the shaft.

In another embodiment, the shaft is maintained stationary and the wall thickness and shaft eccentricity transducers are rotated about the axis of the shaft.

In another embodiment, the $X_1$ (eccentricity) and $(X_2 - X_1)$ (wall thickness) transducers are driven by a lathe screw which advances the transducers in a continuous motion lengthwise along the shaft. In this embodiment, the transducers measure in a helical path winding around the exterior surface of the shaft. Although this path is an approximation to the path traced when the transducers remain fixed at a particular station, for many practical applications the approximation is entirely satisfactory.

In another embodiment, more suitable for thick-walled shafts, no counterbalance is added to the shaft. Instead, an amount of material is removed from the heavy side of the shaft at a particular station, sufficient to eliminate the excess mass at that location. This could be accomplished by machining equipment controlled by the computation circuit.

FIG. 9 shows a shaft to which a counterbalance tape has been applied to its outside surface. In the preferred embodiment, the tape is a self-adhering aluminum tape manufactured by Minnesota Mining and Manufacturing Company and known as Scotch Brand Tape No. 405 Aluminum Foil Tape. The tape 46 is applied in a continuous manner along the tubular shaft on its outside surface. The width of the tape may be decreased if less weight is required at a particular station, or the weight may be increased by using more than one layer of tape at a particular station.

In a more elegant embodiment, the counterbalancing tape is cut to shape from a sheet of adhesive-coated metal protected by a disposable peel-off layer of paper, by a cutting machine controlled by the computation circuit. As shown in FIGS. 9 and 9a, the sheet of adhesive-coated metal 48 has a width equal to the circumference of the shaft and a length equal to the length of the shaft. The cutting machine 52 of FIG. 6 has two spaced cutting heads which determine the width of the tape at each station.

From the above discussion, it is clear that the method of the present invention encompasses the balancing of solid shafts as well as tubular shafts. When solid shafts are to be balanced, the wall thickness transducer is removed and the computation circuit solves a different set of equations, but otherwise the basic steps of the method remain the same.

Further, it is clear that the present invention does not preclude the use of vibration dampers applied to the shaft, as is known in the art, to reduce any residual vibrations.

The foregoing detailed description is illustrative of several embodiments of the invention and it is understood that additional embodiments thereof will be obvious to those skilled in the art. The embodiments described herein together with those additional embodiments are considered to be within the scope of the invention.

What is claimed is:

1. A method for balancing tubular shafts typically having varying wall thickness and eccentricity at different stations along the shaft, comprising the steps of:
    (1) mounting the shaft for rotation about an axis parallel to a reference plane surface;
    (2) rotating the shaft about the axis;
    (3) positioning at a selected station along the shaft both an $X_1$ electrical transducer for measuring the separation between the reference plane surface and the external surface of the shaft and an $X_1 - X_2$ electrical transducer for measuring the thickness of the wall of the shaft along a line extending normally from the reference plane surface to the axis of the shaft at the selected station, the $X_1$ and $X_1 - X_2$ transducers continuously measuring as the shaft is rotated and continuously converting the measured quantities into electrical signals as the shaft is rotated;
    (4) applying the electrical signals generated by the transducers to a computation circuit adapted to determine from the electrical signals generated at the selected station the required amount of counterweight and its required angular location around the shaft to balance the shaft at the selected station;
    (5) repeating the steps (3) and (4) at each remaining selected station along the shaft until the steps have been performed at all of the selected stations;
    (6) applying lengthwise along the shaft at the required angular locations a strip of counterweight material providing the required amount of counterweight to counterbalance the selected stations of the shaft.

2. The method of claim 1 further comprising the intermediate step between step (5) and step (6) of:
    preparing a strip of counterweight material for application lengthwise along the shaft and shaped to provide the required amount of counterweight at the required angular position for each station along the shaft.

3. The strip of counterweight material produced by the method of claim 2.

4. A balanced tubular shaft comprising:
    (a) a tubular shaft having an exterior surface; and,
    (b) a strip of counterweight material produced by the method of claim 2 and attached to the exterior surface of said tubular shaft at the required angular location around said tubular shaft to balance it.

5. The method of claim 1 further comprising the preliminary step of preparing the shaft for balancing, prior to step (1).

6. The method of claim 5 wherein the shaft is prepared by annealing it.

7. The method of claim 5 wherein the shaft is prepared by straightening it.

8. The method of claim 5 wherein the shaft is prepared by applying a surface treatment to it.

9. The method of claim 5 wherein the shaft is prepared by applying a surface coating to it.

10. A method for balancing a tubular shaft having irregular wall thickness and some degree of eccentricity at different stations along its length, comprising the steps of:
   (1) measuring the wall thickness and eccentricity of the tubular shaft at points around the shaft at a selected station along the shaft; and then,
   (2) determining, for the station, from the measured wall thickness and eccentricity the required amount of counterweight and its required angular location to counterbalance the unbalanced mass at the station;
   (3) preparing, after step (2), to measure the wall thickness and eccentricity at a different station along the shaft; and then,
   (4) repeating steps (1)–(3) until measurements have been made at all selected stations along the shaft;
   (5) preparing, after step (4), a continuous strip of counterweight material providing the required amount of counterweight to counterbalance the selected stations of the shaft; and then,
   (6) applying the continuous strip of counterweight material to the shaft at the required angular locations to counterbalance the unbalanced mass at the selected stations.

11. The continuous strip of counterweight material produced by the method of claim 10.

12. A balanced tubular shaft comprising:
   (a) a tubular shaft having an exterior surface; and,
   (b) a strip of counterweight material produced by the method of claim 10 and attached to the exterior surface of said tubular shaft to balance it.

13. A method for balancing a shaft having some degree of eccentricity at different stations along its length, comprising the steps of:
   (1) measuring the eccentricity of the shaft at points around the shaft at a selected station along the shaft; and then,
   (2) determining, for the station, from the measured eccentricity, the required amount of counterweight and its required angular location to counterbalance the unbalanced mass at the station;
   (3) preparing, after step (2), to measure the eccentricity at a different station along the shaft; and then,
   (4) repeating steps (1)–(3) until measurements have been made at all selected stations along the shaft;
   (5) preparing, after step (4), a continuous strip of counterweight material providing the required amount of counterweight to counterbalance the selected stations of the shaft; and then,
   (6) applying the continuous strip of counterweight material to the shaft at the required angular locations to counterbalance the unbalanced mass at the selected stations.

14. The continuous strip of counterweight material produced by the method of claim 13.

15. A balanced shaft comprising:
   (a) a shaft having an exterior surface; and,
   (b) a strip of counterweight material produced by the method of claim 13 and attached to the exterior surface of said shaft to balance it.

* * * * *